United States Patent [19]

Bright

[11] Patent Number: 5,228,642
[45] Date of Patent: Jul. 20, 1993

[54] CANOPY OR PANEL ACTUATION SYSTEM

[75] Inventor: Frederick A. Bright, Preston, United Kingdom

[73] Assignee: British Aerospace Public Limited Company, London, England

[21] Appl. No.: 642,213

[22] Filed: Jan. 16, 1991

[30] Foreign Application Priority Data

Jan. 16, 1990 [GB] United Kingdom ............... 9000953

[51] Int. Cl.$^5$ ............................................. B64C 1/32
[52] U.S. Cl. ............................ 244/121; 244/122 AF
[58] Field of Search ............ 244/118.5, 121, 122 AE, 244/122 AF, 129.1, 129.4; 403/289, 290, 322, 325; 24/634, 635

[56] References Cited

U.S. PATENT DOCUMENTS

| 2,327,951 | 8/1943 | Zaleske | 403/289 |
| 2,654,135 | 10/1953 | Grizzard et al. | 403/325 |
| 2,951,274 | 9/1960 | Elsner | 24/635 |
| 3,139,721 | 7/1964 | Daubenspeck | 244/121 |
| 3,240,520 | 3/1966 | Dailey et al. | 403/325 |
| 3,455,248 | 7/1969 | Sutton et al. | 403/325 |
| 4,860,838 | 8/1989 | Asak | 403/290 |
| 4,902,045 | 2/1990 | McGugan et al. | 403/289 |

Primary Examiner—Galen Barefoot
Attorney, Agent, or Firm—Young & Thompson

[57] ABSTRACT

An aircraft canopy ejection system includes a releasable coupling 22 in the load path between an opening/closing jack 19 and the canopy. The coupling 22 is released immediately before emergency jettison of the canopy.

9 Claims, 4 Drawing Sheets

CANOPY OR PANEL ACTUATION SYSTEM

BACKGROUND OF THE INVENTION

This invention relates to a canopy or panel actuation system and in particular, but not exclusively, to an aircraft canopy actuation system allowing emergency opening of the canopy.

A need exists for a system which allows an aircraft canopy to be opened and closed by an actuator during routine operation and which also allows the canopy rapidly to be ejected during an emergency ejection operation.

SUMMARY OF THE INVENTION

According to one aspect of this invention, there is provided a canopy or panel actuation system comprising a canopy or panel means mounted for opening and closing movement relative to an aperture, linear actuator means for opening the canopy or panel means, and releasable coupling means in the load path between said canopy or panel means and said drive means.

According to another aspect of this invention, there is provided an aircraft cockpit canopy assembly including a canopy, a longitudinal structural member secured to said canopy and having its aft end region hingeably attached to the aircraft body, drive means coupled to said structural member intermediate its ends for opening and closing the canopy, ejection means for effecting emergency opening of said canopy, and means for uncoupling said drive means from said canopy on actuation of said ejection means.

BRIEF DESCRIPTION OF THE DRAWINGS

By way of example only, one specific embodiment of the invention will now be described, reference being made to the accompanying drawings in which:

FIG. 1b is a diagrammatic view of part of the rear cockpit canopy portion of the aircraft cockpit of FIG. 1a;

DETAILED DESCRIPTION OF THE INVENTION

Figure 1A:
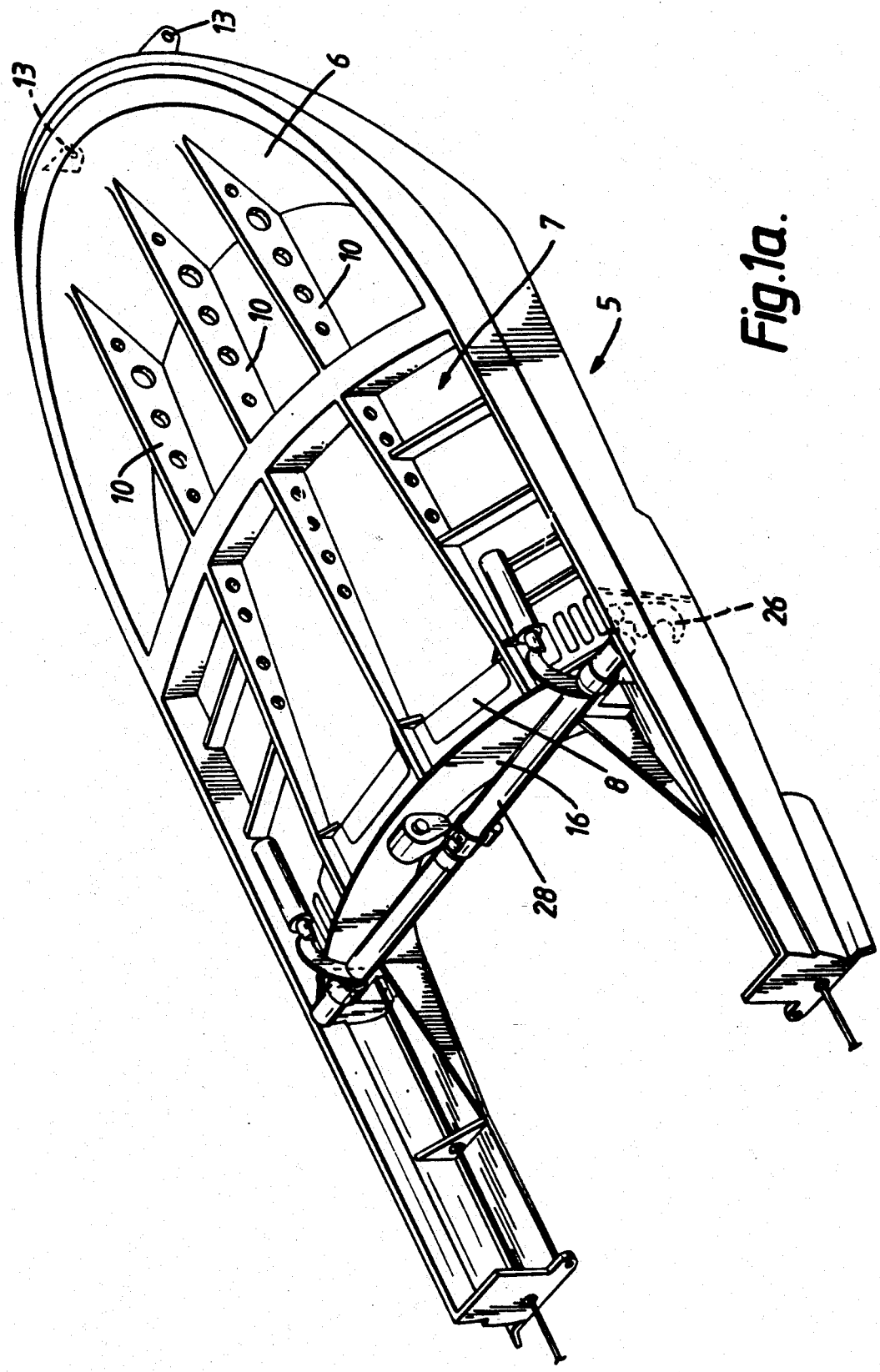
FIG. 1a is a diagrammatic view of part of the front cockpit canopy portion of an aircraft cockpit including an actuation system in accordance with the invention.
Figure 1B:
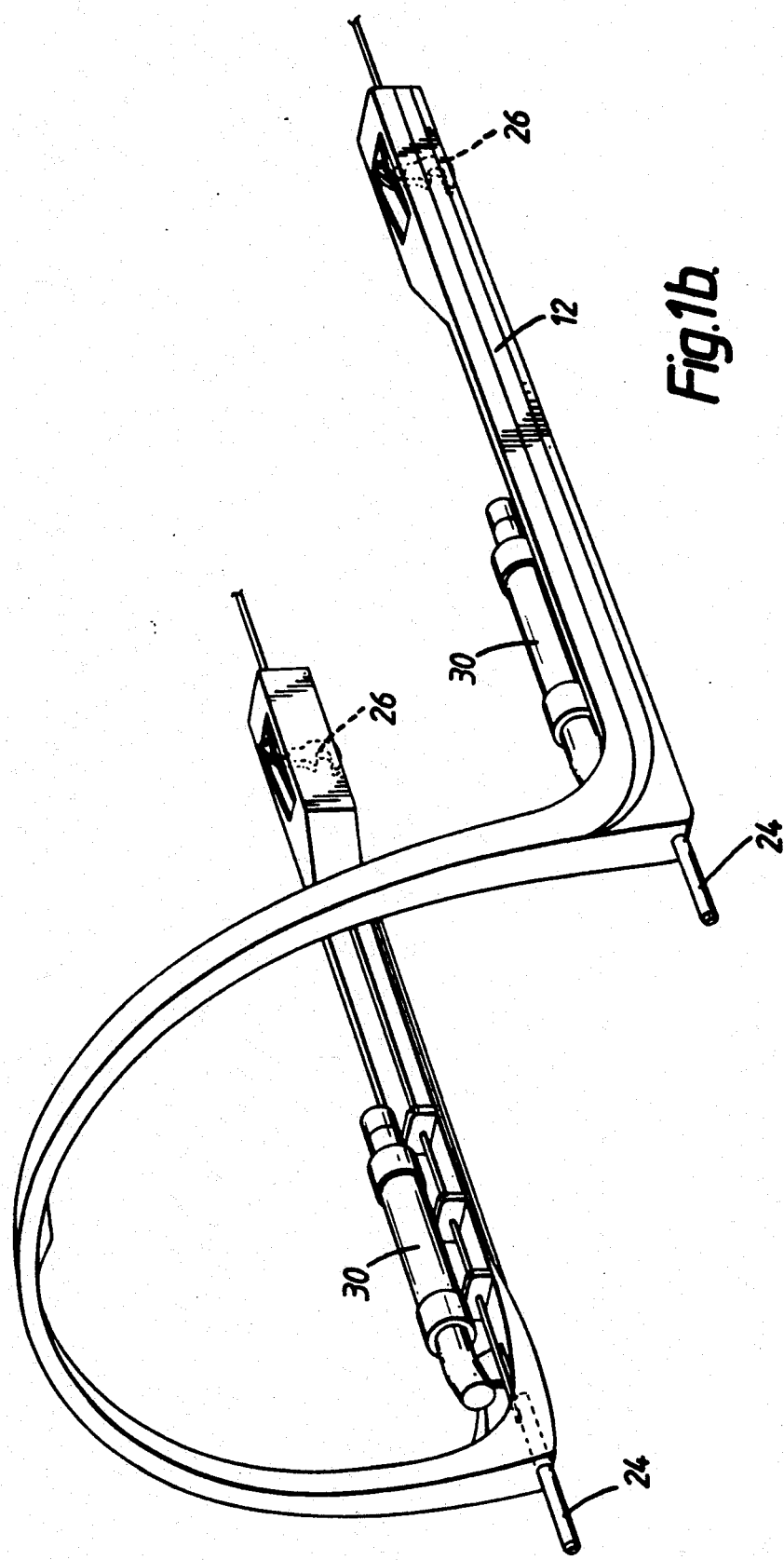

Referring to FIGS. 1a and 1b the canopy is made of a forward casting 4 and a rearward casting 5 which are secured together and support the canopy glass. The rearward casting 5 includes a slanted arcuate wall 6, a floor 7, and a forward pressure bulkhead 8 and, as seen better in FIG. 2, these latter three items constitute a pressure barrier or bulkhead between the pressurised atmosphere of the cockpit (i.e. above the floor 7). To assist sealing, the lower edge of the bulkhead 8 carries a seal strip 9. A plurality of strengthening ribs 10 extend longitudinally of the floor 7.

Figure 2:
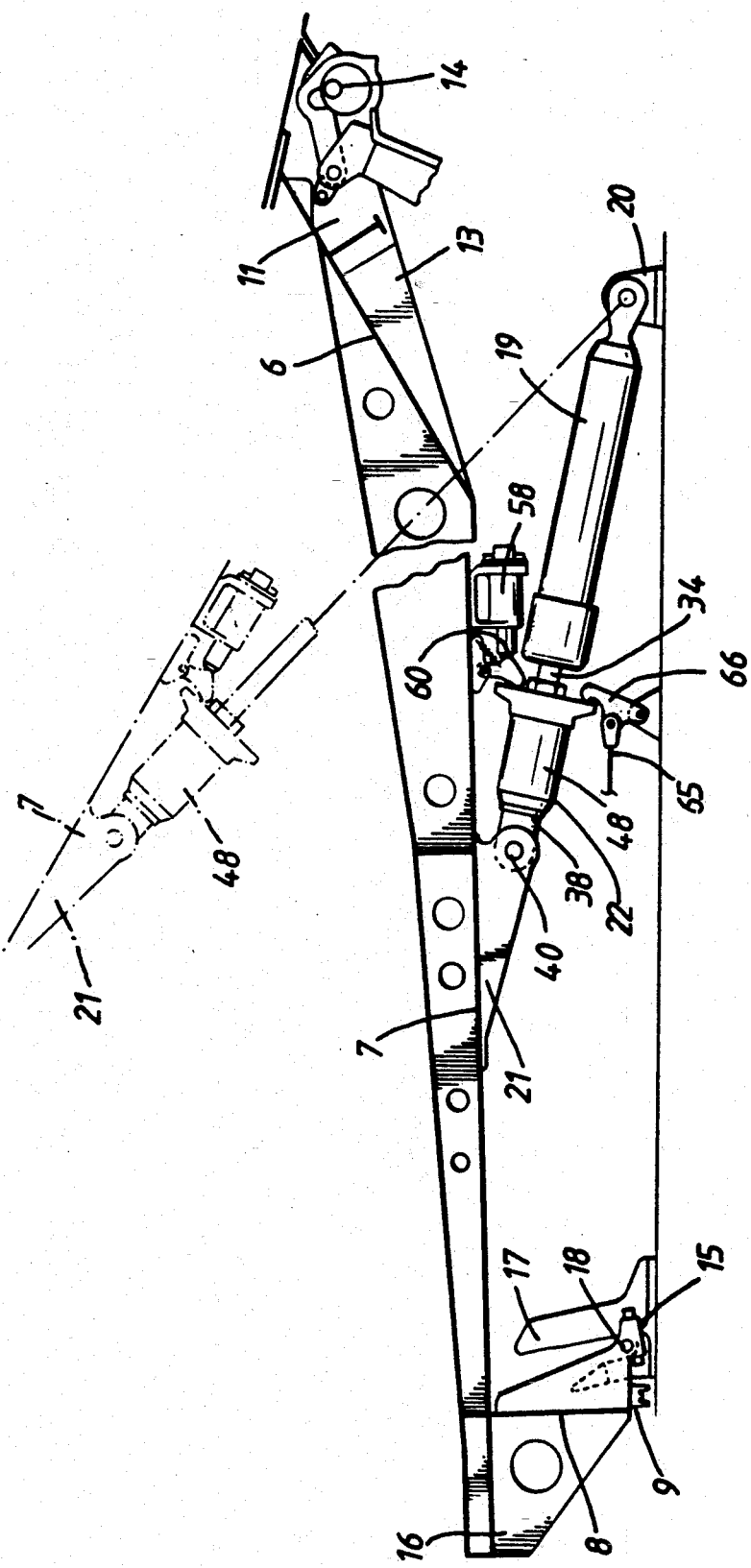
FIG. 2 is a detailed side view taken on the centreline of the arrangement of FIG. 1a and 1b with the front part taken on the cockpit centerline and the rear part taken on the right hand hinge.

A peripheral structural frame 12 extends around the front and rear castings and a pair of hinge brackets 13 extend rearwardly from the frame adjacent the rear end of the rear casting. As seen in FIG. 2, these brackets cooperate with shearable hinge pins 14 secured within the fuselage.

The forward end of the rear casting is provided with a structural cross-member 16 extending between opposed edges of the peripheral frame 12. Referring to FIG. 2 the structural cross-member 16 includes a single transverse roller bearing 18 and two longitudinal parallel bearings 15 which co-operate with a guide abutment bracket 17 secured to the cockpit structure as the canopy nears its closed position to guide the roller bearing 18 towards the base of a slot in the bracket 17. When the canopy is fully closed, the cooperation of the roller bearing 18 with the bracket 17 prevents relative movement of the associated mid-region of the canopy with respect to the aircraft body in the longitudinal sense. The forward and rearward ends of the canopy are allowed to "float" longitudinally within limits, when the canopy is closed. Elsewhere, the canopy and the cockpit include associated abutments which prevent lateral movement of the canopy relative to the fuselage when the canopy is closed.

Figure 3:
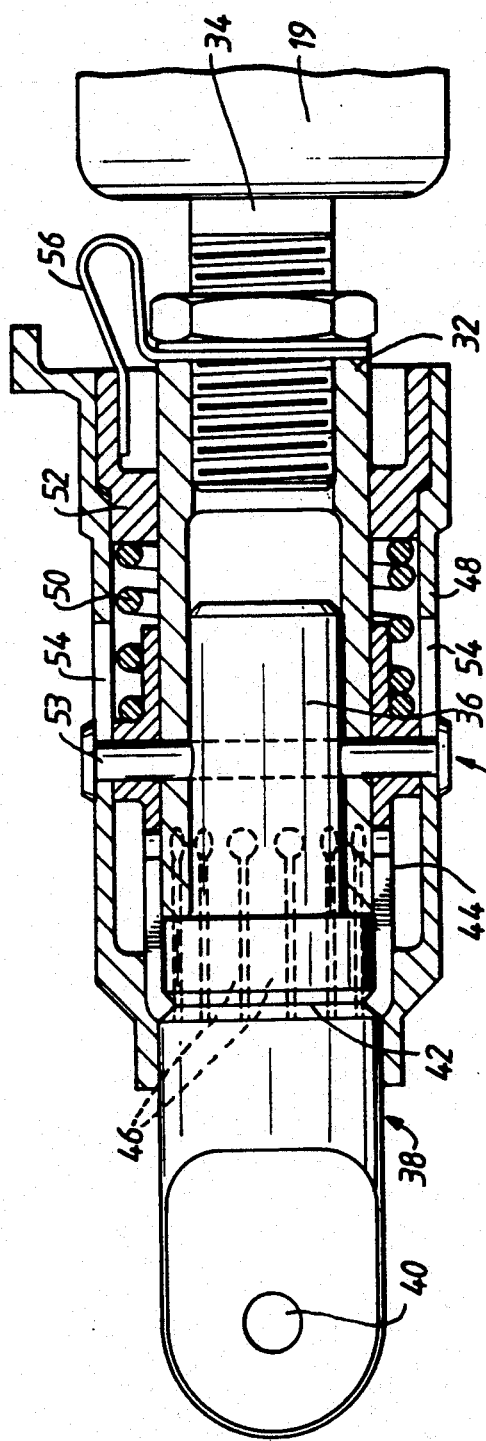
FIG. 3 is a detailed view of a releasable coupling used in the arrangement of FIGS. 1 and 2.

A main hydraulic jack 19 extends between a bracket 21 on the lower surface of the floor 7 and an anchorage point 20 on the aircraft body. The anchorage point 20 is allowed to float when the canopy is closed to accommodate differential thermal expansion but is fixed when the canopy is away from its closed position. The jack 19 may be extended and retracted to open and close the canopy during routine operation. The jack 19 is coupled to the bracket 21 by a releasable coupling 22 which is shown in FIG. 3 and will be described in more detail later. The releasable coupling allows the jack to be uncoupled quickly when the canopy is to be ejected or jettisoned.

The canopy also includes a locking mechanism which comprises two bolts 24 and hooks 26 provided on each side of the canopy and which are latched and unlatched by turning a common torque tube 28. On each side of the front of the canopy is secured an ejection rocket 30. The ignition of the rockets 30, actuation of the torque tube 28 and release of the coupling 22 are initiated substantially simultaneously when an ejection command is received so that the canopy is flung open, shearing the hinge pins 14 at the aft of the canopy thus to jettison the canopy.

Referring now to FIGS. 2 and 3, the coupling 22 comprises an inner sleeve 32 secured at one end to the end of an actuator rod 34 of the main jack 19 and the other end of th esleeve 332 slidably receives a stub end 36 of a jack end fitting 38 which is pivotally attached at 40 to the bracket 21. The stub end 36 includes a circumferential locking groove 42, and a cylindrical spring 44 surrounds the sleeve and has slots which define fingers 46, the free ends of which locate (in the locked or coupled condition) in the locking groove 42 to prevent separation of the jack end fitting 38 from the sleeve 32 and thus from the actuator rod 34. A release sleeve 48 is slidably mounted around the jack end fitting 38 and the inner sleeve 32. The forward end of the release sleeve 48 holds the fingers 46 in the locking groove 42. The release sleeve 48 is biassed rearwardly by a spring 50 acting between an inner rib 52 forming part of the release sleeve 48 and a pin 53 extending through opposed bores in the inner sleeve 32, an open-ended diametral bore on the stub end 36, and two opposed slots 54 in the release sleeve 48.

If the release sleeve 48 is moved forwardly, the fingers 46 are released so they may rise out of the groove to allow the jack end fitting 38 to separate from the main jack 19. The release sleeve is prevented from returning to its original position by a non-return flat spring 56.

Figure 4:
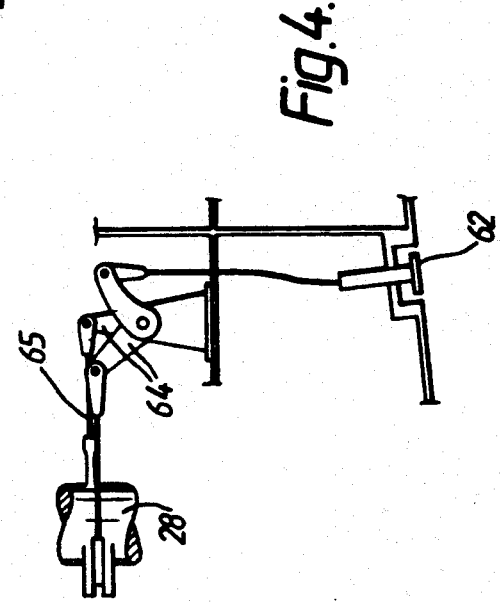
FIG. 4 is a top plan view showing part of the external manual release mechanism.

Referring to FIGS. 2 and 4, the release sleeve 48 may be moved forwardly either manually or by a piston unit 58. The piston unit 58 is secured to the lower surface of the floor 7 and, on firing, drives a pivotable striker 60 against the rear end of the release sleeve 48 to drive it forwards. Manual release is effected by pulling an external unlock handle 62 (see FIG. 4). This rotates two levers 64, one of which is connected by a calbe to the torque tube 28, and the other of which is connected by a cable 65 to a striker arm 66 pivoted on the cockpit structure, which co-operates with the rear end of the release sleeve 48.

Thus, pulling the external unlock handle 62 turns the torque tube 28 to unlock the bolts and hooks and, at the same time, releases the jack end fitting 38 to enable it to separate from the main jack 19. It will be appreciated that the releasable coupling may be located anywhere in the load path between the canopy and the main jack. Thus, if required it could be located at the other end of the jack, adjacent the fuselage.

The invention extends to any inventive combination of the features defined above or disclosed in the description.

Further details of the canopy structure described herein are included in our co-pending U.S. applications Ser. Nos. 07/642,211 and 07/642,212, filed on the same date and assigned to the same assignees.

I claim:

1. A canopy or panel actuation system comprising a canopy or panel means hingedly mounted for opening and closing movement relative to an aperture, linear actuator means arranged selectively to apply opening and closing movement to said canopy or panel means, a separable coupling means in series with said linear actuator means for coupling saidlinear actuator means to said canopy or panel means, ejection motor means spaced beyond said linear actuator means relative to the hinge axis, said ejection means being actuable to generate a thrust for effecting emergency opening of said canopy or panel means, and means for effecting separation of said coupling means from said linear actuator means on actuation of said ejection means.

2. A canopy or panel actuation system according to claim 1, wherein said coupling means includes movable release means, said systemfurther comprising a release actuator means for moving said release means to release said coupling.

3. A canopy or panel actuation system according to claim 2, wherein said coupling means includes two coupling parts, a latch element fixed with respect to one of said parts and latchable with the other, said release means being operable to withdraw or allow withdrawal of the latch element from said other coupling part.

4. A canopy or panel actuation system according to claim 3, wherein said latch element is spring biassed away from engagement with said other coupling element, and said release means maintains said element latched until movement thereof by said a release actuator means.

5. A canopy or panel actuation system according to claim 2, including non-return means for preventing return movement of said release means once it has been moved by said actuator means.

6. A canopy or panel actuation system according to claim 2, wherein said a release actuator means includes a pyrotechnic actuator.

7. A canopy or panel actuation system according to claim 2, wherein said a release actuator means includes a manually operable lever.

8. A canopy or panel actuation system according to claim 7, including means for locking said canopy or panel means in the closed position, wherein operation of said manually operable lever additionally effects unlocking of said canopy.

9. A canopy or panel actuation system comprising a relatively fixed structure, a canopy or panel means including a structural element pivotally attached to said fixed structure, linear actuator means disposed between said relatively fixed structure and said structural element for moving said structural element to open and close said canopy or panel means, said linear actuator means being pivotally attached at one end to said relatively fixed structure and being connected via a releasable coupling to a pivotal attachment on said structural element, and releasable means disposed adjacent said releasable coupling for releasing said coupling from said linear actuator means for emergency opening of said canopy or panel means.

* * * * *